Oct. 27, 1964  C. G. MATSON  3,154,293
MOTOR-VIBRATOR
Filed Aug. 31, 1961  2 Sheets-Sheet 1

INVENTOR.
C. G. MATSON
BY
ATTORNEY

Oct. 27, 1964     C. G. MATSON     3,154,293
MOTOR-VIBRATOR
Filed Aug. 31, 1961                       2 Sheets-Sheet 2
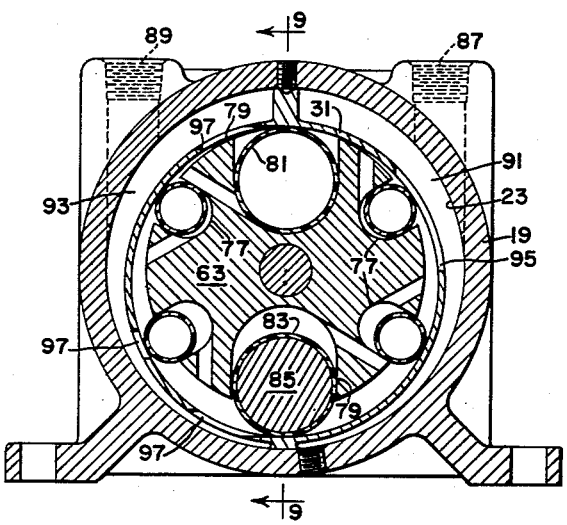
FIG. 8
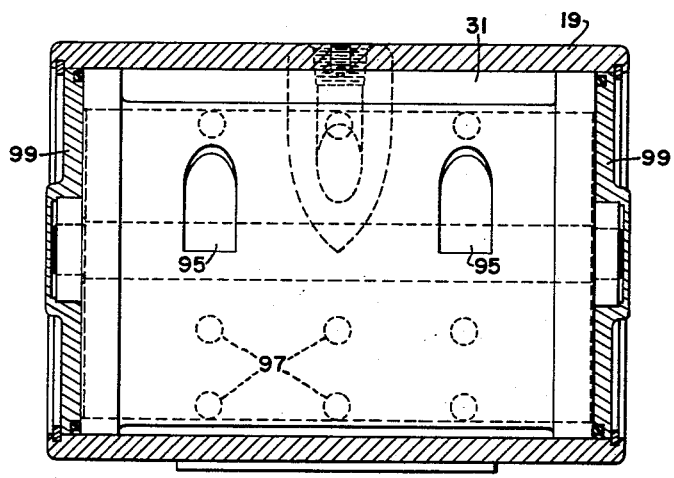
FIG. 9
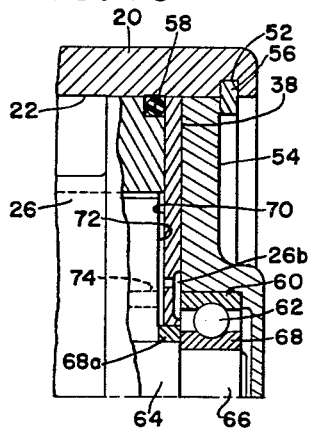
FIG. 10
FIG. 11
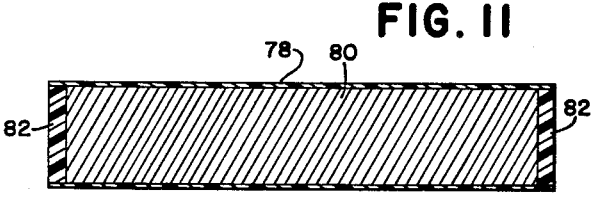
INVENTOR.
C. G. MATSON
BY
ATTORNEY United States Patent Office 3,154,293
Patented Oct. 27, 1964

3,154,293
MOTOR-VIBRATOR
Carl G. Matson, Neponset, Ill., assignor to
Vibrator Mfg. Co., Neponset, Ill.
Filed Aug. 31, 1961, Ser. No. 135,326
5 Claims. (Cl. 259—1)

This invention relates to a fluid-driven motor-vibrator and has for its principal object the provision of an improved device of the character referred to.

Vibrators are of course known in the field of material handling as mechanisms by which the flow, mixing etc. of material is facilitated. A typical vibrator includes a rotating or oscillating part arranged to create unbalanced forces in the support or housing which carries the part, and this housing is attached to the receptacle, object etc. to be vibrated. In the past, vibrators have been driven by separate motors. According to the present invention, the advantages of both devices are combined in one, and in particular there is employed a rotor within an eccentric casing which is part of a simple and economical unit, the rotor employing tubular roller vanes, at least one of which is weighted to create the necessary unbalance. The device is also capable of being converted to a balanced motor by providing the rotor with balanced roller vanes.

A further object of the invention resides in the construction of the unit as a housing having an interior cylindrical wall within which is fitted an eccentrically disposed cylindrical race ring or casing which in turn carries the rotor. The construction features ready removability of the race ring or casing from the housing, means on the casing for dividing the interior of the housing into inlet and outlet fluid-receiving and fluid-discharging chambers, with openings or perforations in the wall of the race ring to conduct the necessary fluid flow. A further object resides in the construction of a unit in which at least one of the opposite end walls or closures is readily removable to provide for access to the interior of the casing, particularly for inspection or replacement of the roller vanes. A still further object of the invention in this respect is the provision of bearing means having thrust elements which keep the rotor out of contact with the interior end faces, thereby preventing scoring thereof.

A still further and important object of the invention resides in the use of tubular vane rollers constructed of low-friction non-metallic material. When the device is used as a combination motor-vibrator, at least one of these rollers may be filled with weight material. The rollers, being of low-friction non-metallic material, are free to shift axially in the rotor but they will not score the interior end faces of the housing. In the case of the rotor that is filled with weight material, opposite ends thereof may be closed with low-friction non-metallic material, again preventing scoring of the faces of the housing.

Still other objects reside in improvements relating to the regulation of inlet and exhaust air, the provision of adequate wear plates, the use of exhaust air and lubricant entrained therein for the lubrication and/or cooling of allied equipment, design of components for easy manufacture, assembly and disassembly and interchangeability of parts, etc.

By the addition of an extended shaft the vibrator can be used to drive auxiliary equipment; motor features can be used in combination with motor force which can be varied, for use primarily as a motor or full weighted roller for maximum vibration.

The prime factor in the design of this unit is its simplicity and ease of repair. Everything in the unit is concentric and automatically aligning with the exception of the eccentric race ring or stator ring which has embodied in its outside diameter the air passages. The inlet passage is so designed that it incorporates an appendix or dead air chamber which serves as a trap or a repository for foreign matter which can be removed through a cleaning port, thus preventing the motor from being damaged by particles of foreign matter in the air.

In addition to the reference to lubrication, it should be noted that the end clearance is such that air will pass the end of the rotor, through the bearing cavity, to the exhaust port on the opposite side. This controlled leakage provides lubrication for the bearings. It should be noted that the bearings require a minimum lubrication and that they carry only the weight of the rotor. Eccentric force is distributed in a line across the full length of the stator or eccentric ring, thereby relieving the bearings of all severe loading. In the construction of this unit it will be noted that the major components are all such that they can be machined on a lathe with minimum of special set up. The end clearance and eccentric clearance can be controlled by the machining of the stator or eccentric ring; e.g., in the event a motor of less horse power is required the amount of eccentricity can be reduced and with it the internal diameter of the stator ring and vice versa. It is possible then to carry a stock of stator or eccentric rings to provide a full range of power as well as variations in air consumption.

The foregoing and other important objects and desirable features inherent in and encompassed by the invention will become apparent as preferred embodiments thereof are disclosed in detail in the ensuing description and accompanying sheets of drawings, the several figures of which are described below.

FIGURE 8 is a section similar to FIGURE 5 but showing a different form of motor-vibrator.

FIGURE 9 is a section as seen generally along the line 9—9 of FIGURE 8, with the race ring in elevation and not in section.

FIGURE 10 is an enlarged fragmentary sectional view showing the relationship among the housing, race ring, end plate, rotor and rotor bearing.

FIGURE 11 is an enlarged sectional view of a typical roller construction as respects a weighted roller.

Figure 1:
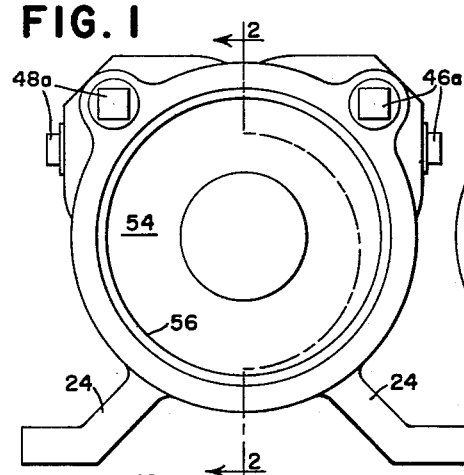
FIGURE 1 is an end view of one form of motor-vibrator.
Figure 3:
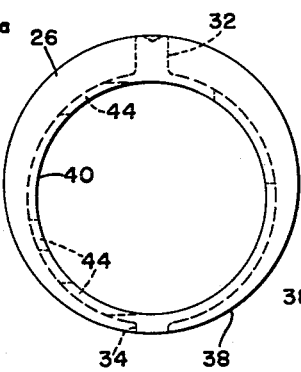
FIGURE 3 is an end view of the race ring.

In that form of invention shown in FIGURES 1 through 5, the motor-vibrator is encased in a housing 20 which has a hollow interior affording a cylindrical interior wall 22. The exterior of the housing is provided with base or flange means in the form of mounting legs 24 for adapting the unit for mounting on a receptacle, object etc. to be vibrated.

The interior of the housing carries therein a cylindrical race ring or casing 26 which has an outside diameter smaller than the diameter of the cylindrical wall 22. The casing or ring is disposed eccentrically within and is surrounded by the wall 22. Means is provided between the wall 22 and exterior surface of the ring 26 for the purpose of providing inlet and outlet chambers 28 and 30. In the preferred construction, this means takes the form of a pair of diametrically opposed radially oppositely outwardly projecting webs 32 and 34 preferably formed integral with the ring 26, which may be a casting. The eccentric disposition of the ring within the wall 22 leaves the crescent-shaped space made up here of the divided chambers 28 and 30. Retention of the ring 26 in the position shown may be accomplished by a set screw, as at 36. Equivalent means, such as a press fit, a key, etc. may also be used.

Figure 4:
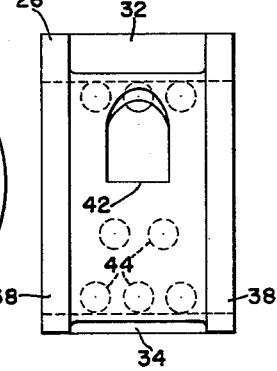
FIGURE 4 is a side view of the same.
Figure 5:
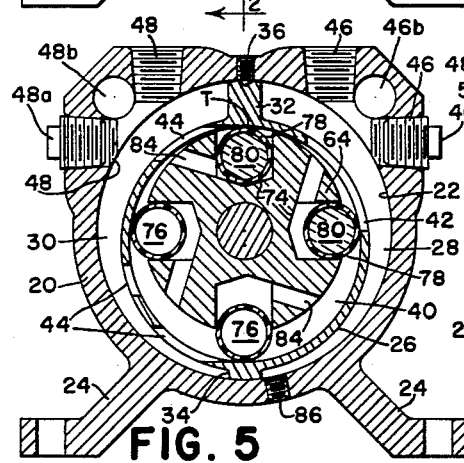
FIGURE 5 is a section generally along the line 5—5 of FIGURE 2.

FIGURE 4 shows the appearance of the ring 26 as seen from the side, it being clear that opposite ends of the ring are circular, as at 38, and these are of course concentric with and are received by the wall 22, the inner portion of the ring between the two circular ends 38, 38 being the eccentric part which forms the eccentric although cylindrical rotor casing 40. The webs 32 and 34 bridge the ends 38 at the diametrically opposed portions indicated. At one diametrically opposite side of a line drawn through the two webs 32 and 34, the ring 26 is provided with an inlet port or opening 42, and at the opposite side the ring has a plurality of outlet ports or openings 44, and the total area of the latter is preferably greater than that of the inlet 42 to avoid restriction of the exhaust. As best seen in FIGURE 5, these are disposed in angularly as well as axially spaced relation about substantially one-half of the ring as exposed to the outlet chamber 30. The housing 20 has inlet and outlet passages 46 and 48 which communicate respectively with the chambers 28 and 30. In the present case, there are four inlets 46, three of which are shown as plugged at 46a and all of which lead to a cross passage 46b which is open to the chamber or crescent 28. The purpose of the several inlets is to give the user a wide choice in making the supply connection, it being noted that these inlets face in several directions. There are also four exhaust holes or outlets 48, three of which are shown here as being plugged at 48a and all of which lead to a cross bore 48b in communication with the outlet chamber or crescent 30. Here again the user is given a choice in the making of outlet connections as well as in the number of outlets opened or used; i.e., unplugged. For example, where increased efficiency is desired at the expense of added exhaust noise, additional plugs 48a may be removed, which will permit proper expansion of the air as it passes from the inlet crescent 28 to the exhaust crescent 30. If exhaust restriction can be tolerated, plugs 48a may be used in all but one exhaust outlet 48. It will be seen that when one inlet is used, as many as four outlets are available, the total exhaust area of which is thus four times the inlet area of the one inlet, capable of handling four atmospheres.

Figure 2:
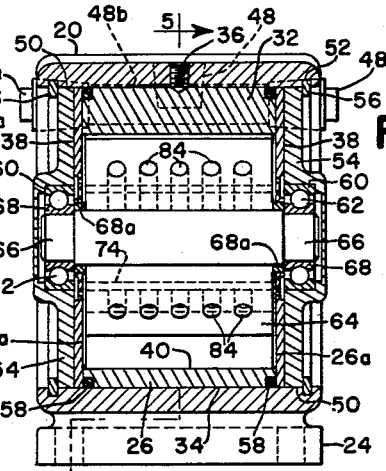
FIGURE 2 is a section taken generally along the line 2—2 of FIGURE 1.

The race ring 26 is here assembled into the casing 20 along with a pair of hardened wear plates 26a, and, as will be seen best in FIGURE 2, the axial dimension of the ring 26 plus the wear plates 26a is less than that between the axially opposite ends of the casing 20. Hence, when the ring and plates are first inserted in the housing or casing 20, being received by the interior wall 22, opposite end portions of the housing 20 will axially overhang the opposite ends 38 of the ring and plate assembly, affording at each end of the housing what may be regarded as a circular recess, designated generally at 50. Just axially outwardly of each such recess, the housing is provided with a concentric annular groove 52. A pair of end plates or closure members 54 complete the external assembly, each plate being of course received in the associated circular recess 50, followed by removable retention therein by removable securing means, here in the form of a snap ring 56 which is received in the associated groove 52. The interior face of each plate 54 abuts the proximate wear plate 26a and the ring and wear plates are thus axially confined by these end plates as well as by the set screw 36, previously described. The set screw or its equivalent is required to prevent rotation of the ring within the cylindrical wall 22. Appropriate sealing rings may be used at 58 among the end plates, wear plates and the ring.

Each end plate has centrally thereof (eccentrically as respects the rotor chamber 40) a circular recess 60 which receives an anti-friction bearing 62. These two bearings are in axial alinement and serve to journal a rotor 64. The rotor has opposite ends in the form of stub shafts 66 which are received by the inner race rings 68 of the bearings, the wear plates of course being appropriately bored to receive these stub shafts. The relationship among the casing, end and wear plates, rotor and bearing 62 will be seen best in FIGURE 10, wherein it is shown that there is a relatively close space between the inner radial face 70 of the wear plate 26a and the proximate radial face 72 of the rotor. It will also be seen that the inner race ring 68 of the bearing 62 is supplemented by a spacer 68a which projects axially inwardly beyond the inner face of the outer race ring, and which therefore constitutes a thrust element maintaining the spaced relationship between the faces or surfaces 70 and 72. This same construction is repeated at the opposite end of the unit. The feature here is that by so confining the rotor, contact between the surfaces 70 and 72 is avoided and therefore there will be no scoring of the faces 70 by the rotor. It will be clear that the space between the surfaces in question is relatively slight so as to avoid excessive fluid leakage. The prevention of scoring is important, since the rotor is preferably constructed of metallic material, as are the wear plates 26a. Another advantage of the construction in general is that it permits of simple and economic construction methods, since the race ring 26 may be relatively precision made as to those dimensions thereof which are critical, whereas the casing 20 may be subjected to less machining. Moreover, the parts being separate are easier to handle in production and assembly. The pockets or recesses for the bearings 62 may also be so designed as to accommodate the bearings with the requisite locational aspects as respects mounting of the rotor, and all these components may be assembled axially or endwise.

The rotor 64 has therein a plurality of identical uniformly angularly spaced radially outwardly opening slots 74. In this case, four such slots are shown, 90° apart. These slots respectively carry roller vanes, here in the form of tubular rollers. In the present case, two of the rollers are shown at 76 and the other two are designated by the numeral 78. These rollers are different from the standpoint that the two rollers 78 are of greater weight than the rollers 76. For the purposes of achieving this, each of the rollers 78 may be filled with weight material, such as a piece of steel stock, lead, etc. as shown at 80. All rollers are, however, identical to the extent that they are constructed of low-friction non-metallic material, such as "Nylon," as best shown in FIGURE 11, which shows one of the weighted rollers 78. It will also be seen in this figure that opposite ends of this tubular roller 78 are closed at 82 with similar low-friction non-metallic material. The rollers, as well as those that are closed at their ends (FIGURE 11) are free to move axially and radially in their respective slots but they will not score the end walls 70 of the wear plates 26a.

The purpose of weighting the rollers 78 is to create unbalanced forces as the rotor rotates, and these forces will of course be transmitted to the housing 20, causing vibration of same and also of the receptacle, article, object etc. to which it is affixed by its mounting legs 24. Thus, there are combined the features and advantages of a motor and vibrator in one unit. Fluid under pressure from any suitable source is introduced through the inlet 46 into the chamber 28 and thence through the opening 42 in the race ring 26 to the rotor chamber 40, acting against the first vane roller to cause the rotor to rotate in a clockwise direction. As the rotor continues to turn, the vane rollers pass successively over the outlet openings 44, the fluid exiting at 48. The rotor slots 74 appropriately communicate at 84 with the periphery of the rotor to enable fluid on the pressure side to force the vanes outwardly against the inner surface of the race ring 26.

One advantage of the removable race ring 26 is that it may be replaced with another of differnt characteristics that will result in changing the stroke of the motor. In such case, the same rotor 64 is used but the replacement race ring will have a different inside diameter, meaning that the eccentricity of the center of the ring as respects the center of the rotor will vary, however keeping the "tangency" of the two circles at the point T (FIGURES 5 and 6).

FIGURES 2 and 10 show how leakage air may be used to lubricate and/or cool the associated bearings 62. For this purpose, the wear plates may be drilled and milled at 26b to lead off small quantities of air from the roller vane pockets 74 to the bearings. As is well known to those versed in the art, air for driving motors of the general type disclosed contains a small amount of oil.

Figure 6:
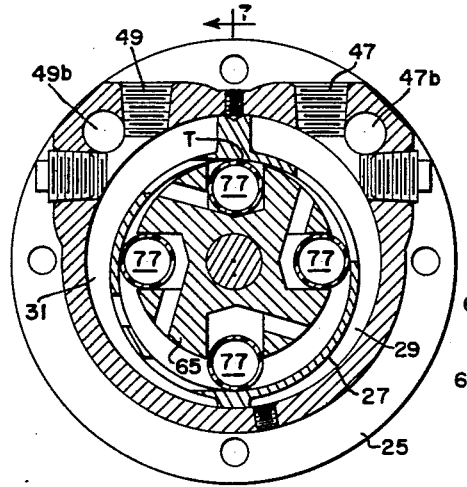
FIGURE 6 is a section similar to FIGURE 5 but showing the adaptation of the design for use as a motor or pump.
Figure 7:
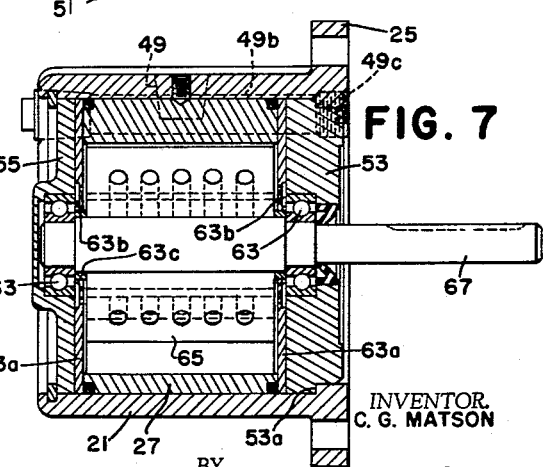
FIGURE 7 is a section on the line 7—7 of FIGURE 6.

A motor construction involving the basic principles just described, with the exception of the vibrator aspects, is shown in FIGURES 6 and 7. In view of the duplication of parts, a completely detailed description is regarded as unnecessary. However, for purposes of identification of the components, the housing is designated by the numeral 21 and has a circular mounting flange 25 thereon enabling end mounting thereof on allied equipment to be driven. The unit in this case has several inlets and outlets 47 and 49 comparable to those at 46 and 48 in FIGURES 1-5 plus cross passages 47b and 49b in communication with the inlet and exhaust crescents 29 and 31 respectively. One end of the cross passage 49b has a flush type plug 49c which may be removed to allow the cross passage to lead its exhaust out at that side; e.g., into the interior of other equipment for cooling and/or lubricating purposes. One end 53 of the housing 21 is closed, but the other end 55 may be similar to the closure plate 54. The end 53 is shown here as being separate from the casing 21, the two having cooperative annular shoulder means at 53a to permit easy assembly of the end 53 into the casing 21 from the left. A race ring 27 similar to 26 is used in this construction, and a rotor 65 has one of its shaft ends extended at 67 for connection to a suitable driven means. The bearing constructions at 63, wear plates 63a, passages 63b, spacers 63c, etc. and the relationship thereof to the remainder of the structure are the same as previously described. In this case, all roller vanes, as at 77, are identical.

The housing 20 in FIGURES 1 through 5 is provided with a drain opening which is normally closed by a removable plug 86 located at the "appendix" end of the inlet chamber 28 and beyond the inlet port 42, which end is a dead area and thus serves as a trap for foreign matter introduced with the air. A similar detail is repeated in FIGURES 6 and 7, which will be recognized without further description.

In the further modified form of the invention shown in FIGURES 8 and 9, a housing 19 is provided with an internal cylindrical wall 23 which is associated with a race ring 31 of a construction comparable to the race ring 26. As seen in FIGURE 9, the casing 19 is more elongated than that in FIGURES 1 through 5, and the rotor 63 is of different construction, certain of the slots, as at 77, being relatively small and others, as at 79, being relatively larger. There are in this case six slots, four of the small slots 77 and two of the large slots 79. The latter two are diametrically opposite and respectively carry relatively large roller vanes 81 and 83, the latter being weighted at 85 in the manner of that shown in FIGURE 11. It will be obvious that other details follow the roller and rotor construction of FIGURES 1 through 5.

In this case, inlet and outlet passages 87 and 89 communicate respectively with inlet and outlet chambers 91 and 93, respectively, and these in turn communicate through the race ring 31 via a pair of inlet ports 95 and a plurality of outlet ports or openings 97. The end plate and bearing constructions, indicated generally at 99 in FIGURE 9, may be identical to those already described. Other similarities will be readily apparent and further description is regarded as unnecessary. This modification shows another way in which unbalance in the rotor may be created, so far as concerns the type of vibratory effects desired. A unit following this pattern will be employed for heavier duty operation than that of FIGURES 1 through 5, for example. Also, in this modification, such refinements as the wear plates, plural inlets and exhausts, etc. have been omitted in the interests of brievity, but as in all cases disclosed here, the several features may be interchanged and used in any of the various combinations suggested.

Features and advantages other than those enumerated will readily occur to those versed in the art, as will many modifications and alterations in the preferred embodiments disclosed, all of which may be achieved without departure from the spirit and scope of the invention.

What is claimed is:

1. A fluid-driven motor-vibrator, comprising: a housing including means forming a rotor chamber having a cylindrical wall and axially opposite end walls and provided with inlet and outlet openings; a rotor within the chamber and eccentrically surrounded by said cylindrical wall and having axially opposite ends respectively closely proximate to but out of contact with said end walls, said rotor having a plurality of uniformly angularly spaced radial slots therein; bearing means in said end walls and journalling the rotor, each bearing means having a thrust element confining said rotor against axial shifting in amounts sufficient to cause the ends of the rotor to contact the end walls; and a plurality of non-metallic vane members, one radially and axially shiftably carried in each rotor slot, at least one of said vane members being of greater weight than the others to create unbalanced forces effective to vibrate the housing.

2. A fluid-driven motor-vibrator, comprising: a housing including means forming a rotor chamber having a cylindrical wall and axially opposite end walls and provided with inlet and outlet openings; a rotor within the chamber and eccentrically surrounded by said cylindrical wall and having axially opposite ends respectively closely proximate to but out of contact with said end walls, said rotor having a plurality of uniformly angularly spaced radial slots therein; bearing means in said end walls and journalling the rotor, each bearing means having a thrust element confining said; rotor against axial shifting in amounts sufficient to cause the ends of the rotor to contact the end walls; and a plurality of vane members, one radially and axially shiftably carried in each rotor slot, each vane member having at least at its axially opposite ends portions of low-friction non-metallic material to prevent scoring of the end walls, at least one of said vane members being of greater weight than the others to create unbalanced forces effective to vibrate the housing.

3. The invention defined in claim 2, in which: each vane member is a tubular roller of such low-friction non-metallic material, said vane member of greater weight containing weight material and having its opposite ends closed by low-friction non-metallic material.

4. A fluid-driven motor comprising: a housing including means forming a rotor chamber having a cylindrical wall and axially opposite end walls and provided with inlet and outlet openings; a rotor within the chamber and eccentrically surrounded by said cylindrical wall and having axially opposite ends respectively closely proximate to but out of contact with said end walls, said rotor having a plurality of uniformly angularly spaced radial slots therein; bearing means in said end walls and journalling the rotor, each bearing means having a thrust element confining said rotor against axial shifting in amounts sufficient to cause the ends of the rotor to contact the end walls; and a plurality of vane members, one radially and axially shiftably carried in each rotor slot.

5. A fluid-driven motor comprising: a housing including means forming a rotor chamber having a cylindrical wall and axially opposite end walls and provided with inlet and outlet openings a rotor within the chamber and eccentrically surrounded by said cylindrical wall and having axially opposite ends respectively closely proximate to but out of contact with said end walls, said rotor having a plurality of uniformly angularly spaced radial slots therein; bearing means in said end walls and journalling the rotor, each bearing means having a thrust element confining said rotor against axial shifting in amounts sufficient to cause the ends of the rotor to contact the end walls; and a plurality of vane members, one radially and axially shiftably carried in each rotor slot, each vane member having at least at its axially opposite ends portions of low-friction non-metallic material to prevent scoring of the end walls.

References Cited in the file of this patent

UNITED STATES PATENTS

| | | |
|---|---|---|
| 2,077,733 | Amtsberg | Apr. 20, 1937 |
| 2,631,544 | Wilcox | Mar. 17, 1953 |
| 2,776,625 | Cook | Jan. 8, 1957 |

FOREIGN PATENTS

| | | |
|---|---|---|
| 1,043,728 | France | June 17, 1953 |
| 1,054,018 | France | Oct. 7, 1953 |